(12) United States Patent
Sanchez

(10) Patent No.: US 7,065,660 B2
(45) Date of Patent: Jun. 20, 2006

(54) POWER MANAGEMENT BASED ON CURRENT STATE AND DURATION OF A REQUEST SIGNAL

(75) Inventor: Samuel Navarro Sanchez, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 476 days.

(21) Appl. No.: 10/242,289

(22) Filed: Sep. 12, 2002

(65) Prior Publication Data

US 2003/0074589 A1  Apr. 17, 2003

(30) Foreign Application Priority Data

Sep. 14, 2001  (EP)  ............................... 01410116.6

(51) Int. Cl.
*G06F 1/26* (2006.01)
(52) U.S. Cl. ..................................... 713/300; 713/310
(58) Field of Classification Search ................ 713/300, 713/310
See application file for complete search history.

(56) References Cited

U.S. PATENT DOCUMENTS

| | | | | |
|---|---|---|---|---|
| 4,245,184 | A | * | 1/1981 | Billings et al. .............. 323/235 |
| 5,251,208 | A | * | 10/1993 | Canniff et al. .............. 370/438 |
| 5,404,578 | A | | 4/1995 | Kuge et al. .................... 455/73 |
| 5,528,238 | A | * | 6/1996 | Nickerson .................... 341/67 |
| 5,748,560 | A | * | 5/1998 | Sawada ....................... 365/233 |
| 5,780,941 | A | | 7/1998 | Pauve ......................... 307/139 |
| 6,194,940 | B1 | * | 2/2001 | Hunter et al. ............... 327/298 |
| 6,255,746 | B1 | | 7/2001 | Takahashi et al. .......... 307/112 |
| 6,272,585 | B1 | * | 8/2001 | Roobrouck et al. ......... 710/260 |
| 6,445,882 | B1 | * | 9/2002 | Hirano ........................ 396/52 |
| 6,823,413 | B1 | * | 11/2004 | Fujiki .......................... 710/260 |

OTHER PUBLICATIONS

Abstract of JP 02-077668, *Patent Abstracts of Japan*, 1991.
Abstract of JP 08-070245, *Patent Abstracts of Japan*, 1997.

* cited by examiner

*Primary Examiner*—Lynne H. Browne
*Assistant Examiner*—Tse Chen

(57) ABSTRACT

A control module for a system having a current state comprising one of a first state and a second state, the control module being operable to receive a first input corresponding to the current state and a second input corresponding to a requested state, the control module being operable when the current state and the requested state are different, to generate a output to cause a transition from the current state to the requested state.

7 Claims, 2 Drawing Sheets

POWER MANAGEMENT BASED ON CURRENT STATE AND DURATION OF A REQUEST SIGNAL

FIELD OF INVENTION

This invention relates to a control module and a computer provided with a control module.

BACKGROUND OF INVENTION

Conventionally computers and other devices are provided with a manually operable power button which a user is able to operate to turn the computer or other device on or off. In many current devices, the power button does not act directly on the power supply, but instead generates a request to an appropriate power controller, for example, a Super I/O controller, to set the device to a power on or power off state. In some circumstances, it will not be immediately apparent whether a device is in a power on state or power off state causing a user to inadvertently turn the device on when it is desired that the device be turned off, or vice versa. This is particularly the case where the user of the computer or other device is visually impaired.

An aim of the invention is to reduce or overcome the above problem.

SUMMARY OF THE INVENTION

According to a first aspect of the invention we provide a control module for a device having a current state comprising one of a first state and a second state, the control module being operable to receive a first input corresponding to the current state and a second input corresponding to a requested state, the control module being operable when the current state and the requested state are different, to generate a output to cause a transition from the current state to the requested state.

The second input may comprise a request signal having a length, wherein a request signal having a relatively short length may correspond to the first state and wherein a request signal having a relatively long length may correspond to the second state.

The module may comprise a first filter element operable to block a request signal having a relatively short length when the system is in the first state.

The module may comprise a second filter element operable to generate a first output signal on receipt of the request signal.

The module may comprise a third filter element operable to generate a second output signal on receipt of a request signal having a relatively long length when a device is in the second state.

The first output instruction may comprise a first pulse and the second output instruction may comprise a second pulse delayed relative to the first pulse.

The control module may comprises an output module operable to receive the first output instruction the second output instruction and generate the output accordingly.

The first state may comprise a power on state and the second state may comprise a power off state.

According to a second aspect of the invention, we provide a computer comprising a control module according to the first aspect of the invention, a manually operable power switch operable to generate the second input and a power control module responsive to the output to cause a transition between the power on state and the power off state.

BRIEF DESCRIPTION OF THE FIGURES

The invention will now be described by way of example only with reference to the accompanying drawings, wherein;

FIGURE ONE is a state machine of a device embodying in the present invention, and FIGURE TWO is a circuit diagram for a control module embodying the present invention.

DESCRIPTION OF THE PREFERRED EMBODIMENTS

Figure 1:
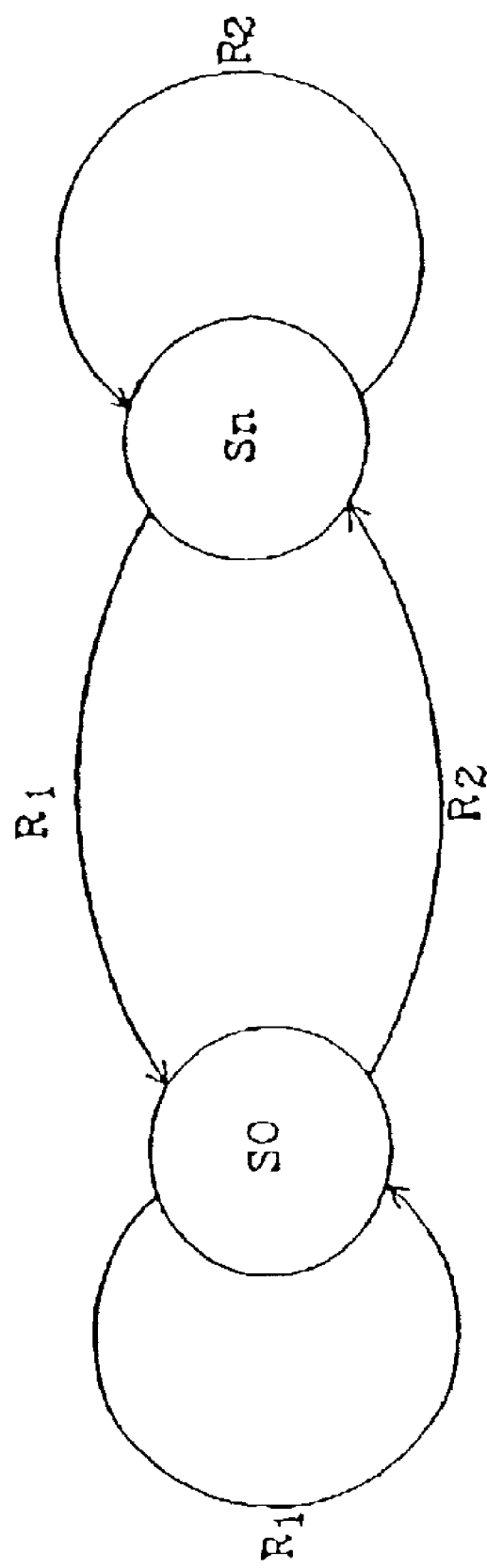

Referring to FIG. 1, a state machine for a device embodying the present invention is shown. The state machine has two operating states., a first state S0 and a second state Sn. The device is operable to receive an input comprising one of R1, a request that the system be in the first state S0, and R2, that the system be in the second state Sn. As will be apparent, when the requested state is different to the current state a transition between states occurs. When the requested state matches the current state, the device remains in the current state.

It is envisaged that the device is a computer, although it might be suitable for any appropriate device. In FIG. 1 in accordance with the Advanced Configuration and Power Interface specification (ACPI) the first, S0 state, may correspond to the G0 working condition of the computer and the state Sn may correspond to any one of states S1 to S4 representing sleeping states of the computer or S5 corresponding to the soft off state. Thus, a computer embodying the present invention may be responsive to a user's input to undergo a transition between a working state and a sleeping state or remain in the current working state or sleeping state as appropriate.

Figure 2:
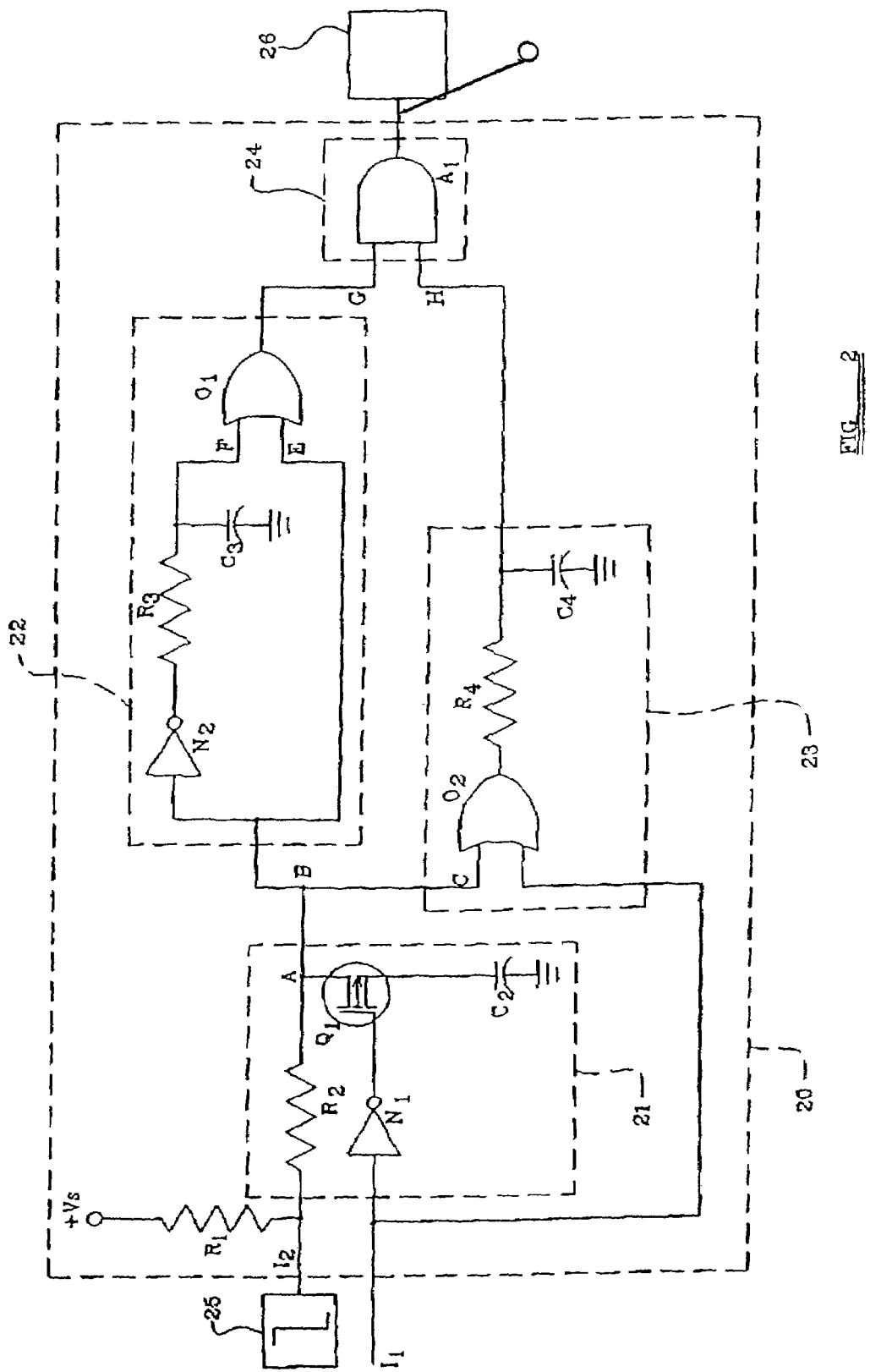

It will be apparent that a suitable control module embodying the invention may be provided as an ASIC or as a discrete module or embedded in an appropriate controller such as a Super I/O controller. A control module embodying the present invention is illustrated in FIG. 2, by way of example.

A control module embodying the present invention for a computer is generally illustrated at 20. The module comprises a first input, $I_1$ which is high when the device is in a first, power on state and low when in a second, power off, sleeping state, and a second input $I_2$ corresponding a requested state received from, in this example, a manually operable power switch generally illustrated at 25. The control module 20 generates an output O which in this example remains high and undergoes a transition from high to low to instruct a suitable power controller, here illustrated at 26, to cause a transition between the current state and requested state. The module 20 comprises a first filter element 21, a second filter element 22 and a third filter element 23. The second filter element 22 and third filter clement 23 are each operable to generate a respective output instruction which is received by an output module 24, which generates the output O.

The control module 20 operates as follows. When no input is received at the second input $I_2$, point A on the circuit is held high by virtue of the connection via resistors R1, R2 to a standby power supply Vs, which remains high even when the computer is in a power off state. When a user operates the power switch 25 to generate a request, the input $I_2$ goes low and is held low as long as the user operates the power switch 25, for example holds down a power button. To request that the computer is in a first, power on state, the user operates the power switch 25, for a relatively short period of time and to request a second, power off state operates the power switch 25 for a relatively long period of time. The time period corresponding to each state can be set by selecting the resistance and capacitance values of resistors $R_2$ $R_3$, $R_4$ and capacitors $C_2$, $C_3$, $C_4$.

In this example, the resistance and capacitance values in each filter element 21, 22, 23 are such that R2 and C2 have a time constant of two seconds, R3 and C3 have a time constants of one second and R4 and C4 have a time constant of 1.5 seconds. A input request signal having a length less than two seconds corresponds to a request for the computer to be in a first power on state whilst an input comprising a request signal having a length greater than two seconds corresponding to a request that the machine be in a second, power off state.

The circuit operates as follows:

1. Computer is ON; $I_1$ is High

In filter element the high input $I_1$ is inverted by the NOT gate N1 and so a low signal is received by a PMOS Q1. Q1 is thus closed, and C2 is charged at voltage $V_3$.

a) Short Request Signal

Where a request signal having a length of less than 2 seconds is received at input $I_2$, it will be filtered by the R2C2 filter of filter element 21, and thus no request signal will be sent to the second filter element 22 on input B or the third filter element 23 on input C. There will thus be no change at the output O and there will be no transition in the state of the computer.

b) Long Request Signal

When a request signal longer than two seconds, i.e. longer than the R2C2 time constant of the first filter is received, A will go low and hence inputs B and C will go low. In the second filter element 22, the input E to OR gate O1 will likewise go low. The output of NOT gate N2 will meanwhile go high, but input F to OR gate O1 will remain low for a time period dependent on the time constant R3C3. Both inputs E and F at OR gate O1 will therefore be low and input G of the output module 24 will go low. After a time period dependent on the time constant R3C3 input F will go high and input C will likewise go high. Because input $I_1$ is high, the output of OR gate O2 will remain high and thus input H will remain high. The AND gate A1 of the output module 24 receives inputs C and H, and as input G goes low, output O will go low, subsequently going high as input G once again goes high. A suitable power controller, for example a Super I/O controller, will respond to the high-low transition of output O and cause the computer to undergo a transition to the power off state.

2) Computer is OFF; $I_1$=0

As $I_1$ is low, the output of NOT gate N1 is high and so the PMOS Q1 will be open Any input received at $I_2$ will thus be passed to inputs B and C without filtering or delay.

a) Short Request Signal

When a pulse of less than 2 seconds is received, at $I_2$ inputs B and C will go low immediately, since there is no filtering effect from the first filter element 21 As above, the second filter element 22 will generate an output passes to input C which goes low for a time period set by the time constant R3C3, in the present example 1 second, and then goes high. As the input $I_1$ is low and the input C goes low, the output of OR gate O2 will similarly go low. The time constant R4C4 is however selected such that a relatively short pulse will not be passed to the input H of the AND gate A1. Thus, input H remains high, whilst input G goes low for 1 second then returns high. The output O will then go low for 1 second and return high again, generating a pulse which the power controller 26 recognises as an instruction to cause the computer to undergo a transition to the power on state.

b) Long Request Signal

If a pulse longer than 2 seconds is received at $I_2$, then the second filter element 22 will generate an output comprising a 1 second pulse as discussed above, passed to input C of the output module 24. As before, the output of the OR gate O2 will go low. Providing the request signal is longer than the time constant R4C4, input H will then go low as the request signal from A is transmitted by the R4C4 filter. The time constants R3C3 and R4C4 are selected such that input H goes low only after input C has gone low and then returned high. The output O of the AND gate A1 will go low in accordance with input C, go high and then go low again in accordance with input H. The power controller 26 will then receive two successive pulses, the first pulse turning the computer on for 0.5 seconds and the second pulse turning the computer off again. Thus, a short request signal will turn the computer on, whilst a long request signal will result in the computer remaining in the off condition.

It could be envisaged that the present invention could be implemented as part of a power controller, for example a Super I/O controller, or be implemented as part of an on/off control of the computer, as an ASIC or as a circuit comprising discrete components or in any other way as desired.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A computer comprising a power management control module, a manually operable switch, and a power control module wherein a current state of the computer comprises a power on state and a power off state, the power management control module being operable to receive a first input and a second input, the first input corresponding to the current state, the second input comprising a request signal received from the manually operable switch and corresponding to a requested state, the requested signal having a time duration, wherein a request signal corresponding to the power off state has a time duration that is different from that of a request signal corresponding to the power on state, generate an output comprising a single pulse when the requested state is different from the current state, cause no change in the output when the request signal corresponds to the power on state and when the computer is in the power on state, and generate an output having two pulses when the computer is in the power off state and when the requested state is the power off state, wherein the power control module is responsive to the output to cause a transition between the power on state and the power off state.

2. The computer according to claim 1 wherein the power management control module comprises a first filter element operable to block a request signal having a relatively short length when the current state of the computer is the power on state.

3. The computer according to claim 2 wherein the power management control module comprises a second filter element operable to generate a first output signal on receipt of the request signal.

4. The computer according to claim 3 wherein the power management control module comprises a third filter element operable to generate a second output signal on receipt of a request signal having a relatively long length when the current state of the computer is the power off state.

5. The computer according to claim 4 wherein the first output signal comprises a first pulse and the second output signal comprises a second pulse delayed relative to the first pulse.

6. The computer according to claim 4 wherein the power management control module comprises an output module operable to receive the first output signal and the second output signal and generate the output accordingly.

7. The computer according to claim 5 wherein the power management control module comprises an output module operable to receive the first output signal and the second output signal and generate the output accordingly.

* * * * *